(No Model.)

A. FREY.
ANIMAL TRAP.

No. 587,548. Patented Aug. 3, 1897.

Witnesses.
A. D. Bloomer
G. B. Heise

Inventor.
Amos Frey.

UNITED STATES PATENT OFFICE.

AMOS FREY, OF WAUSEON, OHIO.

ANIMAL-TRAP.

SPECIFICATION forming part of Letters Patent No. 587,548, dated August 3, 1897.

Application filed November 23, 1896. Serial No. 613,140. (No model.)

*To all whom it may concern:*

Be it known that I, AMOS FREY, of Wauseon, in the county of Fulton and State of Ohio, have invented a new and useful Improvement in Rat or Mouse Traps, which improvement is fully set forth in the following specification, reference being had to the accompanying drawings.

My invention relates to a rat and mouse trap of that character known as an "ever-set" trap; and the invention consists in a receiving-receptacle and a movable dumping-receptacle pivoted upon the receiving-receptacle with a locking and tripping mechanism for retaining the dumping-receptacle in a raised position and lowering the same, respectively, to throw the animal received in the dumping-receptacle into the receiving-receptacle.

The invention further consists in the parts as hereinafter shown, described, and claimed.

Figure 1:
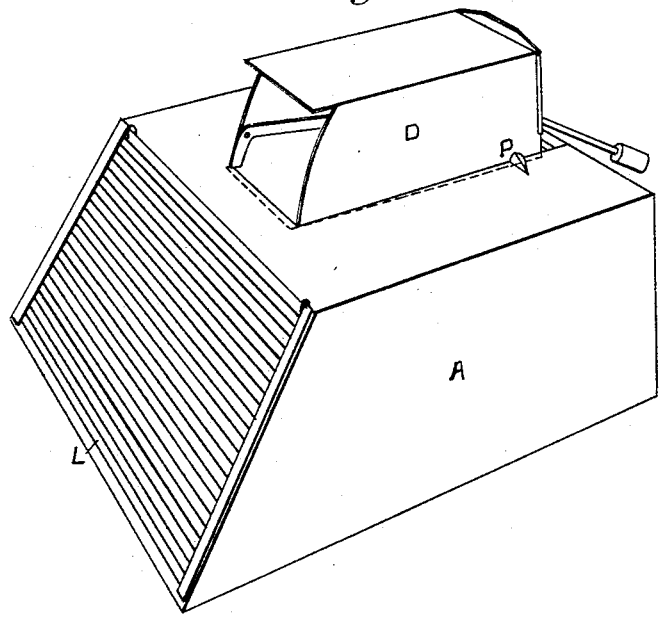
Figure 2:
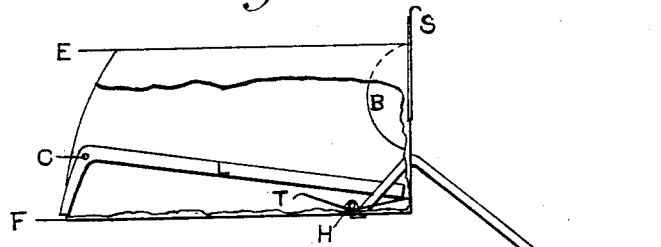

In the drawings, Figure 1 is a perspective view of a trap constructed and arranged in accordance with my invention. Fig. 2 is a detail elevation, partly in section, of the dumping-receptacle.

A designates the receiving-receptacle, which is provided with an orifice upon the upper side and a door L upon the front side. The receiving-receptacle is preferably constructed of metal.

D designates the dumping-receptacle, open upon the front side, thereby providing an entrance for the animal into the same. The receptacle D is pivotally secured upon the receptacle A by the pivot P, passing through the receptacle D, slightly above the floor thereof near the rear end, it being understood that the receptacle D is of a size to fit and swing within the top opening in the receptacle A, the projecting portion E of the top limiting the downward movement of the receptacle D and the projecting portion F of the bottom limiting the upward movement. The receptacle D is held normally in a raised position, due to the weight W, secured upon its rod, which is secured to the receptacle at the opposite end.

B designates the bait-box, arranged with the receptacle D at its rear end, open upon its rear side for the insertion of bait, and closed by a sliding door S.

L designates the locking-lever, pivoted at C to the receptacle D, the forward end projecting downwardly to normally engage with the top of the receptacle A, due to the length and weight of the rear end of the lever.

Pivotally secured upon the pivot P at H is a platform T, the forward side of which is in a convenient position to be depressed by an animal while in the act of reaching the bait in the bait-box B. The rear side, being constantly raised thereby and being in alinement with the rear end of lever L, operates the lever.

In operation an animal entering the dumping-receptacle and endeavoring to secure the bait operates the platform T and raises the rear end of lever L. This operation disengages the forward end of lever L from the top of receptacle A and allows the dumping-receptacle to fall, the weight of the animal overcoming the weight W. The dumping-receptacle when in a downward position allows the animal to slide therefrom into the receiving-receptacle, when the dumping-receptacle rises automatically, owing to the weight W. The longer end of lever L, forcing the forward end over the top of the receiving-receptacle, locks the dumping-receptacle in a raised position, and the trap is set for another animal.

What I claim is—

1. In a rat or mouse trap, a receiving-receptacle provided with an orifice in its top, a dumping-receptacle of a size to fit and swing within the orifice pivotally secured to the receiving-receptacle at its rear side, a lock to normally hold the front side in a raised position comprising a pivoted lever, one end swinging in the arc of a circle over the top of the receiving-receptacle, the opposite end being of a weight to normally hold the forward end over the top of the receiving-receptacle, and a platform pivotally secured within the dumping-receptacle, one side being in a position to be depressed by an animal within the receptacle, the opposite side being in alinement with the weighted end of the locking-lever to raise the same when the platform is rocked to disengage the locking mechanism and allow the dumping-receptacle to fall.

2. In a rat or mouse trap, a receiving-receptacle provided with an orifice in its top, a dumping-receptacle of a size to fit and swing within the orifice, said dumping-receptacle being pivotally secured near its rear side to the receiving-receptacle, the top and bottom of the dumping-receptacle being of a length to engage with the top of the receiving-receptacle to limit the movement of the dumping-receptacle, a locking mechanism to hold the dumping-receptacle in a raised position, and a tripping mechanism to release the same.

AMOS FREY.

Witnesses:
A. S. BLOOMER,
G. B. HEISE.